US006758153B1

(12) United States Patent
Hagen et al.

(10) Patent No.: US 6,758,153 B1
(45) Date of Patent: Jul. 6, 2004

(54) EASILY ADJUSTABLE DOUBLE ELIMINATOR

(75) Inventors: Matthew Brian Hagen, Bettendorf, IA (US); James Irwin Lodico, Hampton, IL (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/639,745

(22) Filed: Aug. 11, 2003

(51) Int. Cl.$^7$ .............................. A01C 7/00; A01C 9/00
(52) U.S. Cl. ...................................... 111/185; 221/211
(58) Field of Search ...................... 111/170, 177–185; 221/211

(56) References Cited

PUBLICATIONS

Sicam Unisem "Semoir Pneumatique Monograine" Brochure, 6 pgs; 1989.
Bomatec "Pneumatic Seed Spacing Grills Type BM 25", Brochure, 4 pgs; 1989.
Kverneland Accord Optima Pneumatic Precision Drill for Maize, Beet, Sunflowers etc.; Brochure 8 pgs; date unknown.
Monosem "Pneumatic Monosem the only Precision Planter"; Brochure 4 pgs; date unknown.
Monosem "The New Seed Drill 502 Monosem BRN"; Brochure 4 pgs; date unknown.
Monosem "Compagnie Ribouleau MS"; Brochure 6 pgs; date unknown.
John Deere FMO "Fundamentals of Machine Operation Planting"; 6 pages; Date Unknown.
Nodet Gougs Semoirs A Elements Pneumatiques, Planter II, Repliable; 1 page; Date Unknown.

*Primary Examiner*—Christopher J. Novosad

(57) ABSTRACT

A pneumatic seed meter comprises a housing and a rotatable seed disc. The rotatable seed disc divides the housing into a reduced air pressure side and a seed side. The rotatable seed disc is provided with seed cells to which individual seeds are attracted by an air pressure. A double eliminator is located in the housing on the seed side so that the double eliminator knocks extraneous seeds from the seed cells of the seed disc. The double eliminator is provided with an adjustment knob extending outside the seed side of the housing for adjusting the position of the double eliminator relative to the seed disc. A transparent viewing window is mounted on the seed side of the housing opposite the double eliminator so that adjustment of the double eliminator can be monitored.

11 Claims, 4 Drawing Sheets

US 6,758,153 B1

EASILY ADJUSTABLE DOUBLE ELIMINATOR

FIELD OF THE INVENTION

The present invention is directed to an easily adjustable double eliminator, wherein the seed meter housing has a viewing window for viewing the adjustment.

BACKGROUND OF THE INVENTION

Agricultural seeding machines use air pressure to meter and transport seed and agricultural chemicals. Pneumatic seed meters on row crop planters fall into two basic systems. In one system positive air pressure, that is air pressure which is greater than ambient air pressure, is used to meter the seeds. In the other system negative air pressure, that is air pressure that is less than ambient air pressure, is used to meter the seeds. An air pump is used to create the positive or negative air pressure. The seed meter comprises a housing that is divided into two sides by a rotating seed disc. The seed disc defines a seed side and a reduced air pressure side of the housing. The differential in air pressure between the two sides attracts individual seeds to seed cells formed in the seed disc. Sometimes the seed cells attract more than one seed. Typically these seed meters are provided with a double eliminator for knocking excess seeds from the seed cells. Proper adjustment of the double eliminator is important to seed meter operation.

SUMMARY OF THE INVENTION

It is an object of the present invention to provide an easily adjustable double eliminator for a pneumatic seed meter.

It is a feature of the present invention that a viewing window is located opposite the double eliminator.

A pneumatic seed meter comprises a housing and a rotatable seed disc. The rotatable seed disc divides the housing into a reduced air pressure side and a seed side. The rotatable seed disc is provided with seed cells to which individual seeds are attracted by an air pressure differential between the seed side and the reduced pressure side operating through seed apertures associated with the seed cells. A double eliminator is located in the housing on the seed side so that the double eliminator knocks extraneous seeds from the seed cells of the seed disc. The double eliminator is provided with an adjustment knob extending outside the seed side of the housing for adjusting the position of the double eliminator relative to the seed disc. A transparent viewing window is mounted on the seed side of the housing opposite the double eliminator so that the double eliminator can be viewed through the viewing window as it is being adjusted by the adjustment knob.

DETAILED DESCRIPTION

Figure 1:
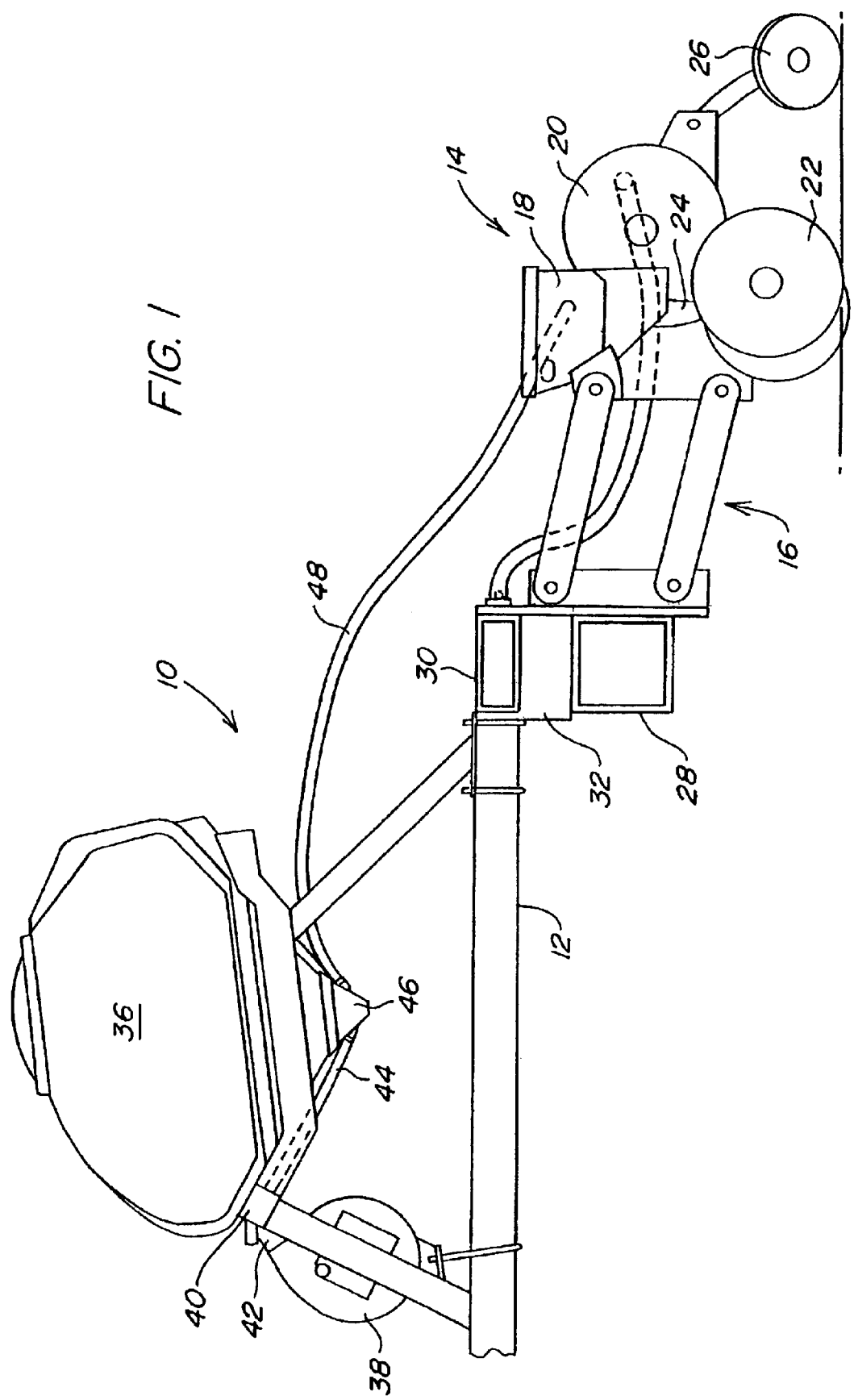
FIG. 1 is a side schematic view of the pneumatic seed delivery system.
Figure 2:
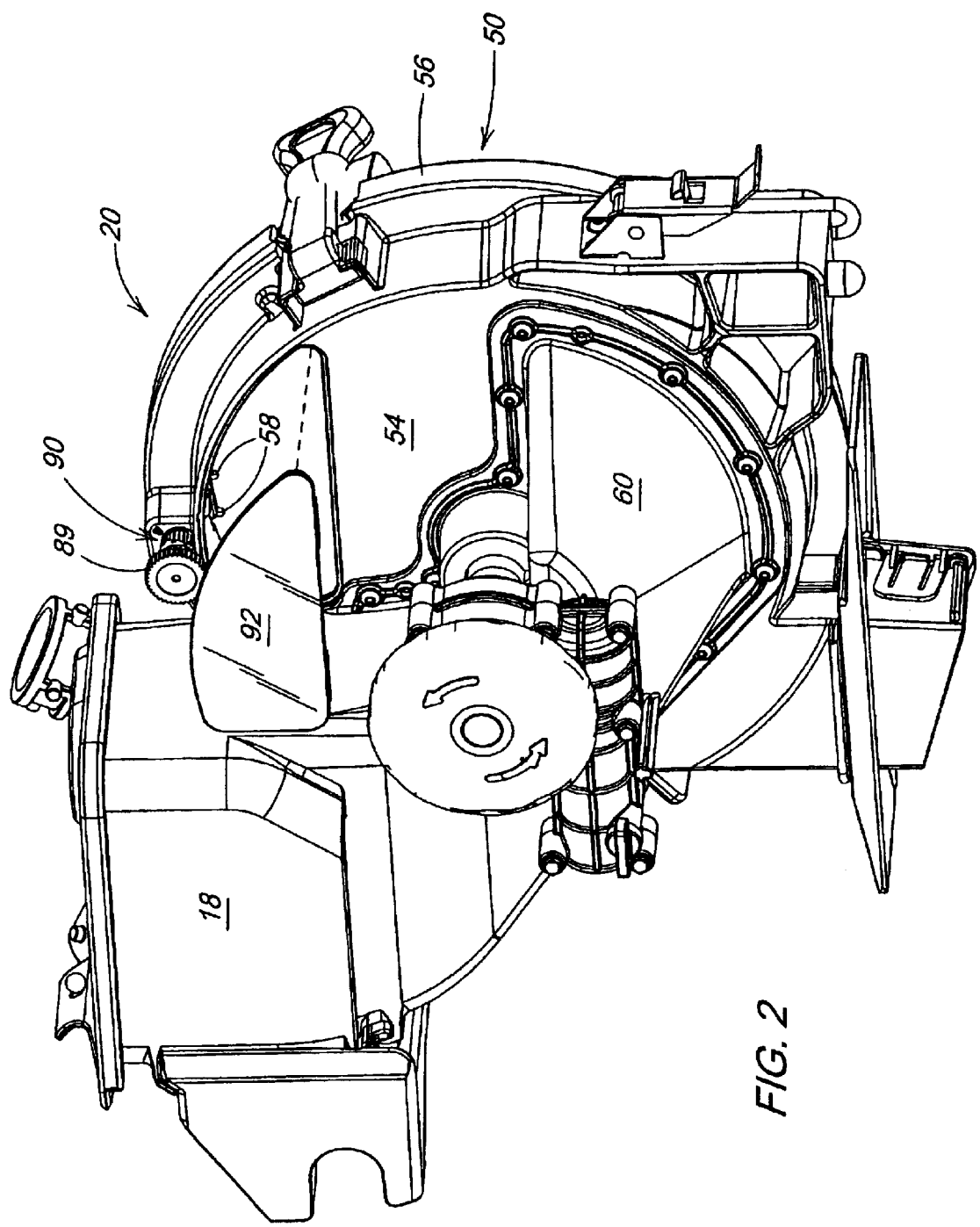
FIG. 2 is an exploded perspective view of a viewing window in a pneumatic seed meter.
Figure 3:
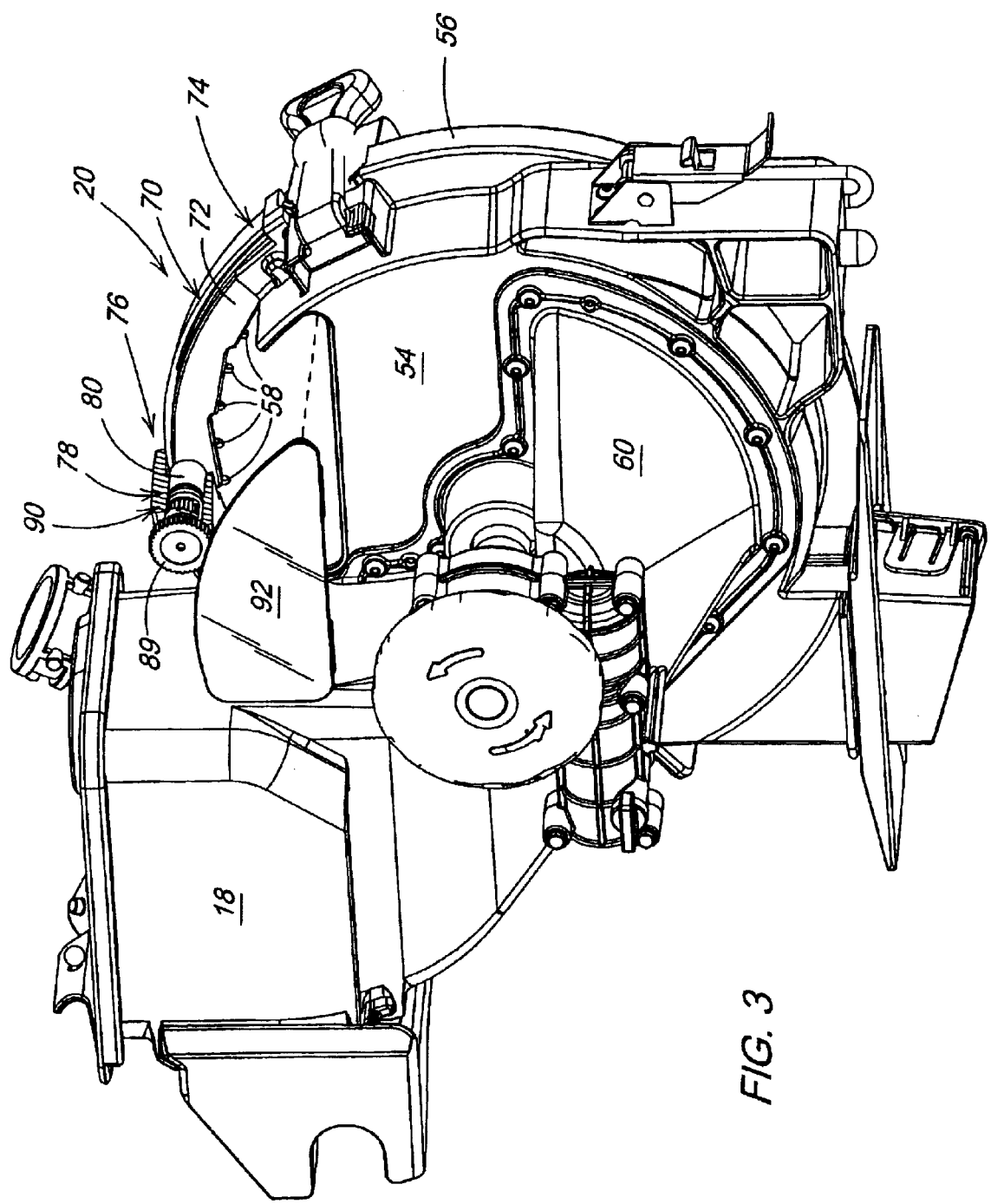
FIG. 3 is an exploded cut away perspective view of the viewing window and double eliminator in a pneumatic seed meter.
Figure 4:
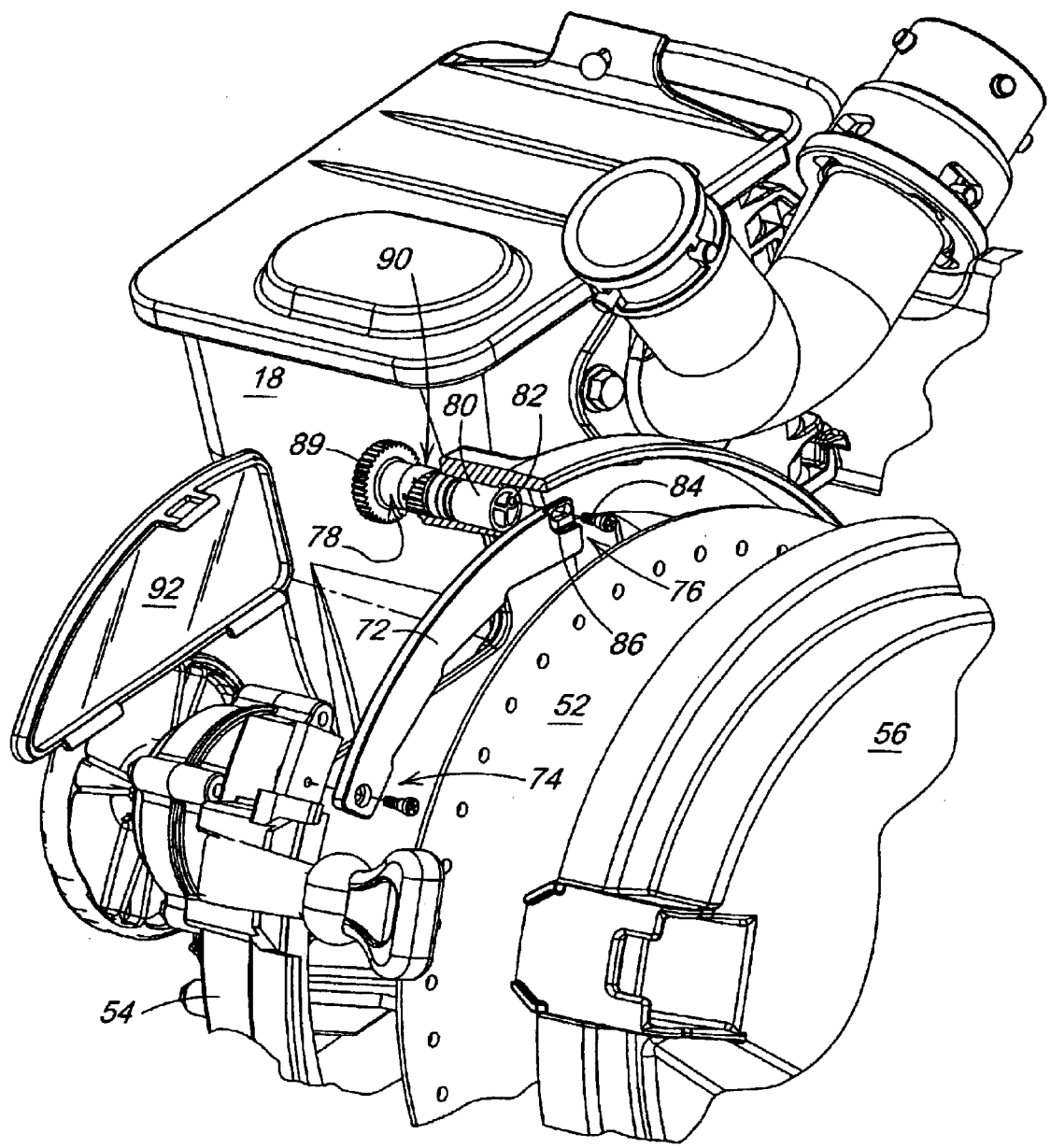
FIG. 4 is an exploded perspective view of the viewing window and double eliminator from the reverse side.

An agricultural seeding machine 10 comprises a frame 12 on which are mounted a plurality of individual planting units 14. The planting units 14 are coupled to the frame 12 by a parallelogram linkage 16 so that the individual planting units 14 can move up and down to a limited degree relative to the frame 12. Each of the individual planting units comprises an auxiliary seed hopper 18 for holding seed, a seed meter 20 for metering seed received from the auxiliary seed hopper 18 and a furrow opener 22 for forming a planting furrow in a field for receiving metered seed from the seed meter 20. The seed is transferred to the planting furrow from the seed meter by a seed tube 24. A closing assembly 26 is used to close the planting furrow with the seed contained therein. In the illustrated embodiment the seed meter 20 is a vacuum seed meter, although positive air pressure could also be used with the subject invention.

The frame 12 is provided with a truss toolbar comprising a main toolbar 28 and a secondary bar 30 that is coupled to the main toolbar by webs 32. The parallelogram linkages 16 of the individual planting units 14 are directly coupled to the main toolbar 28. The secondary toolbar 30 is sealed and functions as a pneumatic manifold for the pneumatic seed meters 20.

Seed is stored in a main hopper 36 mounted on the frame 12. An air pump 38 is used to pneumatically transfer seed from the main seed hopper 36 to the auxiliary seed hopper 18. The air pump 38 is driven by a hydraulic motor, however other motor arrangements could be used, like electric motors for driving the air pump 38. The air pump 38 directs pressurized air to a manifold 40 through main air hose 42. The manifold 40 is formed from a hollow closed tubular support of the frame 12. The manifold 40 is provided with a plurality of manifold outlets corresponding to the number of planting units 14 mounted to the frame 12. Individual air supply lines 44 extend from the manifold outlets and direct pressurized air from the manifold 40 to the upstream side of the nozzle assembly 46. The nozzle assembly 46 is located at the bottom of the main hopper 36. Product located in the main hopper 36 flows by gravity to the nozzle assembly 46. The upstream side of the nozzle assembly 46 is provided with a number of air inlets corresponding to the number of air supply hoses 44. The air inlets are spaced transversely along the upstream side of the nozzle assembly 46. The downstream side of the nozzle assembly 46 is provided with a number of product outlets corresponding to the number of air supply hoses 44. The product outlets are also spaced transversely along the downstream side of the nozzle assembly 46. The product outlets lie opposite from the air inlets. Each air inlet is aligned with a respective product outlet. Product supply hoses 48 extend from the product outlets to the individual auxiliary hoppers 18 for directing product entrained in the air stream to the auxiliary hoppers 18.

The pneumatic seed meter 20 comprises a housing 50 holding a seed disc 52. The housing 50 has a seed side 54 and a reduced pressure side 56. The seed disc 52 is rotatively mounted in the housing 50. The seed disc 52 is provided with seed cells 58 defined by seed apertures. The illustrated seed disc 52 is a flat seed disc wherein the seed cells 58 are only defined by the seed apertures and not by indentations surrounding the seed apertures. The seed disc 52 divides the housing 50 into the seed side 54 and the reduced air pressure side 56.

Seed from the auxiliary hopper 18 is directed to the seed side 54 of the housing 50 by passage 60. The seed forms a seed puddle against the rotating seed disc 52. Individual seeds are attracted to the seed cells 58 by the reduced air pressure on the other side of the seed disc 52. As the seed disc 52 is rotated in a clockwise direction, individual seeds are picked up by the seed cells 58. The individual seeds are rotated out of the seed puddle at the approximately 6:00 O'Clock position around to the 2:00 O'Clock position where They are released to fall into the seed tube 24 and from the seed tube 24 into the planting furrow formed by the furrow opener 22. The individual seeds are released by eliminating the pneumatic pressure differential across the seed disc 52.

Sometimes the seed cells 58 of the seed disc 52 pick up more than one seed. As such the seed meter is provided with a double eliminator 70. The double eliminator 70 comprises an arcuate element 72 having a first end 74 that is pivotally mounted to the housing 50, and a second end 76 that is operatively coupled to an adjustment knob 78. The adjustment knob 78 comprises a barrel 80 that is rotatively mounted to the seed side 54 of the housing 50. The barrel 80 has an eccentric aperture 82 for receiving pin screw 84 that passes through horizontal slot 86 in the second end 76 of the arcuate element 72. The position of the double eliminator 70 relative the seed cells 58 needs to be adjusted for different sized seed. The operator adjusts the double eliminator 70 by engaging the serrated portion 88 of the adjustment knob 78 and turns the knob moving the eccentric pin screw 84. The eccentric pin screw 84 moves the second end 76 of the arcuate element 72 up and down adjusting its position relative to the seed cells 58 on the seed disc 52. The horizontal component of the movement of the eccentric pin screw 84 is taken up as lost motion by the horizontal slot 86. The pin screw 84 has a threaded portion that engages the eccentric aperture 82 and a smooth shank portion that engages the horizontal slot 86. The barrel 80 is provided with a toothed portion 89 for engagement by the operator to adjust the double eliminator 70. The barrel 80 of the adjustment knob 78 is also provided with indicia 90 informing the operator as to the relative position of the double eliminator 70 to the seed cells 58.

To further monitor the adjustment operation and the action of the double eliminator 70, the seed side 54 of the housing 50 is provided with a transparent viewing window 92. The transparent viewing window 92 is located opposite the double eliminator 70 and under the adjustment knob 78.

Having described the illustrated embodiment, it will become apparent that various modifications can be made without departing from the scope of the invention as defined in the accompanying claims.

What is claimed is:

1. A pneumatic seed meter comprising:

a housing having a reduced air pressure side and a seed side;

a disc located in the housing dividing the housing into the reduced air pressure side and the seed side, the disc is rotatably mounted in the housing and is provided with seed cells to which individual seeds are attracted by an air pressure differential between the seed side and the reduced pressure side;

a double eliminator is located in the housing on the seed side so that the double eliminator knocks extraneous seeds from the seed cells of the seed disc, the double eliminator is provided with an adjustment knob extending outside the seed side of the housing for adjusting the position of the double eliminator relative to the seed disc;

a transparent viewing window is mounted on the seed side of the housing opposite the double eliminator so that the double eliminator can be viewed through the viewing window as it is being adjusted by the adjustment knob.

2. The pneumatic seed meter as defined by claim 1 wherein the reduced air pressure side of the housing is coupled to a vacuum source.

3. The pneumatic seed meter as defined by claim 2 wherein the seed side of the seed meter is coupled to an auxiliary seed hopper.

4. The pneumatic seed meter as defined by claim 3 wherein the double eliminator and the viewing window are located at the top of the housing.

5. The pneumatic seed meter as defined by claim 1 wherein the double eliminator comprises an arcuate element having a first end that is pivotally coupled to the housing and a second end that is operatively coupled to the adjustment knob.

6. The pneumatic seed meter as defined by claim 5 wherein the adjustment knob is a rotary knob having an axis of rotation.

7. The pneumatic seed meter as defined by claim 6 wherein the second end of the double eliminator is provided with a pin screw that engages an aperture eccentric to the axis of rotation of the rotary knob, the pin screw passes through a horizontal slot formed in the second end of the arcuate element.

8. The pneumatic seed meter as defined by claim 7 wherein the reduced air pressure side of the housing is coupled to a vacuum source.

9. The pneumatic seed meter as defined by claim 8 wherein the adjustment knob of the double eliminator is located above the viewing window.

10. The pneumatic seed meter as defined by claim 9 wherein the double eliminator and the viewing window are located at the top of the housing.

11. The pneumatic seed meter as defined by claim 10 wherein the seed side of the seed meter is coupled to an auxiliary seed hopper.

* * * * *